No. 756,281. PATENTED APR. 5, 1904.
E. T. POLLARD.
AUTOMATIC WEIGHING MACHINE.
APPLICATION FILED JUNE 25, 1903.
NO MODEL. 2 SHEETS—SHEET 1.

Witnesses
M. L. Adams

Inventor
E. T. Pollard
By his Attorneys
Baldwin Davidson Wight

No. 756,281. PATENTED APR. 5, 1904.
E. T. POLLARD.
AUTOMATIC WEIGHING MACHINE.
APPLICATION FILED JUNE 25, 1903.
NO MODEL. 2 SHEETS—SHEET 2.
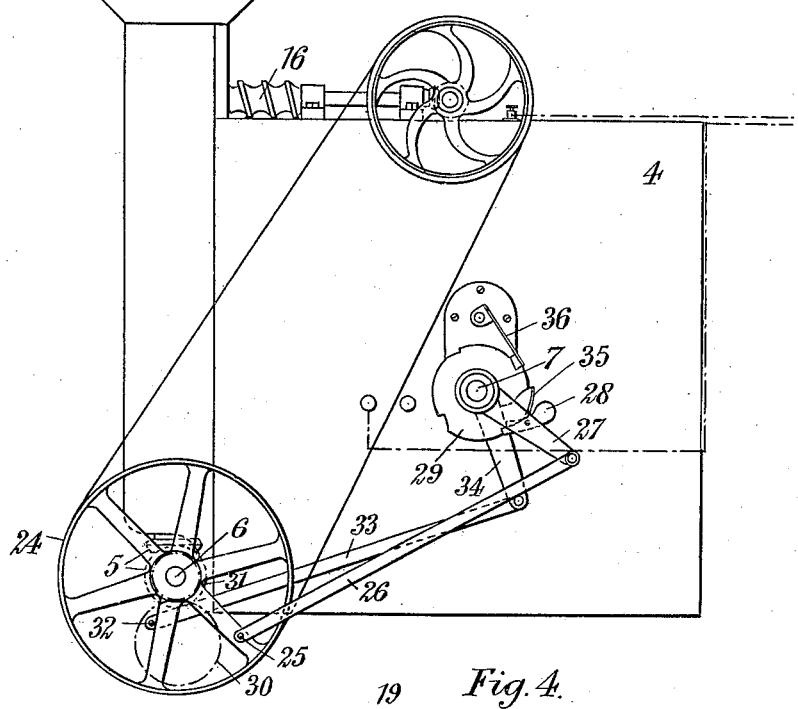
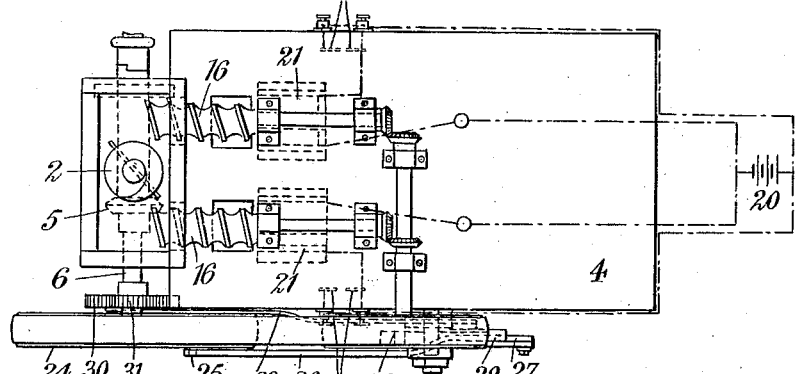
Witnesses
M. L. Adams
Inventor
E. T. Pollard No. 756,281. Patented April 5, 1904.

UNITED STATES PATENT OFFICE.

EDWARD THOMAS POLLARD, OF LONDON, ENGLAND.

AUTOMATIC WEIGHING-MACHINE.

SPECIFICATION forming part of Letters Patent No. 756,281, dated April 5, 1904.

Application filed June 25, 1903. Serial No. 163,146. (No model.)

*To all whom it may concern:*

Be it known that I, EDWARD THOMAS POLLARD, engineer, a citizen of the United States, residing at 25 Whitecross street, in the city of London, England, have invented certain new and useful Improvements in Automatic Weighing-Machines, of which the following is a specification.

The object of this invention is to provide a machine for automatically weighing and delivering such materials as tea, coffee, rice, and other granular or pulverulent materials.

The apparatus comprises a casing supporting a shaft to which a step-by-step movement can be imparted and which carries scale-beams each having at one end a pivoted scoop and at the other a weight. The material to be weighed is fed into one corner of the casing from a hopper by a screw, so as to lie in a heap of approximately constant size. As the shaft revolves a scoop picks up from the heap a little less of the material than it is desired to deliver, the deficit being supplied by a pivoted funnel or chute until the right weight is reached, when the filled scoop falls and completes a circuit, including a source of electricity and an electromagnet, which being thus energized turns the funnel on its pivot into a position in which it delivers onto the heap and not into the scoop, which is subsequently carried round to discharge its contents down a chute into any convenient receptacle.

Figure 1:
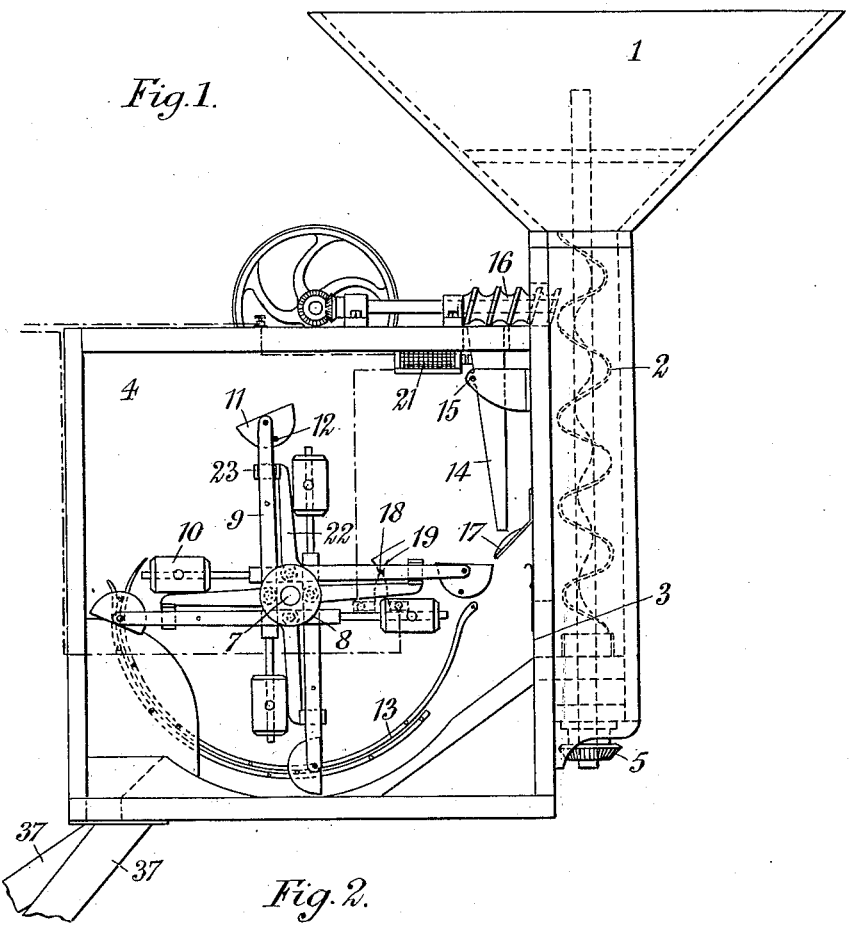
Figure 2:
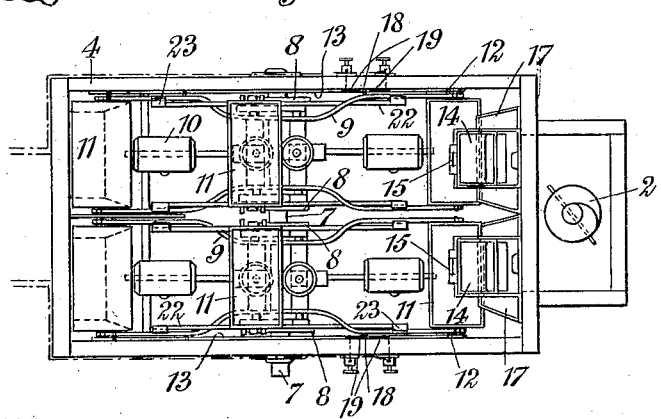

Figure 1 of the drawings is a front view with the side of the casing removed; Fig. 2, a plan with the cover and parts above it removed; Fig. 3, a back view, and Fig. 4 a plan.

1 is a hopper filled with, say, tea, which is fed down by a screw 2 to an adjustable opening 3 near the bottom of one side of the casing 4. The screw is turned through bevel-wheels 5 from a main shaft 6, which can be driven in any convenient way. By this means tea is fed down to form a heap of approximately constant size in the casing 4.

7 is a shaft having fast on it four disks 8, which support the trunnions of the forked scale-beams 9. In the apparatus shown there are eight of these beams in two groups of four; but it will be readily understood that there might be only one group or more groups than two upon the shaft, and that it is not essential that there should be four beams in a group. Each beam carries a weight 10, which is adjustable upon it, and also a scoop 11, pivoted to the beam and so arranged as naturally to hang in the position of the scoop on the right of Fig. 1. The scoops are, however, provided with pins 12, which are caught by guides 13 as the scoops revolve, so as to tip them, as clearly shown. The tea is fed through the opening 3 at such a rate that each scoop as it passes the heap picks up somewhat less than the required weight, and the deficit is supplied by funnels 14, pivoted at 15, and fed with tea by screws 16 from the screw 2. The tea from these funnels normally falls onto a sloping shield 17, and thence into the scoops; but so soon as the right weight is reached the scale-beam takes up a horizontal position, and a pin 18 upon it makes contact between two curved contact-pieces 19, thus allowing an electric current to flow from a battery 20 to an electromagnet 21, which being energized attracts the upper end of the funnel 14, which carries a suitable armature, so that its lower end comes over a hole in the shield 17, and the tea no longer falls into the scoop, but onto the main heap until the shaft 7 is turned a step, when the circuit is broken, owing to the revolution of the scale-beam, and the funnel being released by the magnet swings back. The position shown is that in which the right amount of tea has just been reached and the scale has just balanced, but the funnel has not yet been attracted by the magnet. The disks 8 carry arms 22, each with a pair of lugs 23 embracing one of the beams, so as to limit its freedom of movement.

The movement of the shaft 7 may be effected in any convenient way; but in the arrangement shown it is effected as follows, in order to insure a quick movement of the scoops and a long dwell in the weighing position: On the shaft 6 is a wheel 24, with a crank-pin 25 connected by a rod 26 to an arm 27, loose on the shaft 7. On this arm is a loaded pawl 28, engaging notches on a disk 29, fast on the shaft 7. A toothed wheel 30 on a stud-axle carried by the casing gears with a wheel 31 on the shaft 6, so that the wheel 30 only turns once for every two revolutions of the wheel 24, and a crank-pin 32 on the wheel 30 is connected by a rod 33 to a second arm 34, loose on the shaft 7 and carrying a shield 35, which is thus moved in front of the pawl 28 every alternate stroke, preventing the pawl from engaging the disk 29. A spring-detent 36 is provided to prevent backlash. A weighed quantity of tea is thus delivered down each of the chutes 37 once for every two revolutions of the main shaft 6.

The screws 16, supplying the funnels, may be driven by miter-gear from an auxiliary shaft 38, having on it a belt-pulley 39, driven by a belt 40, passing round the wheel 24.

The machine here claimed is suitable and specially designed for use in conjunction with an automatic parceling-machine shown in application, Serial No. 163,147, filed June 25, 1903; but of course it can be used alone or with any suitable receptacles for the weighed material.

What I claim is—

1. In an automatic weighing-machine, the combination of a horizontal shaft, means for intermittently rotating it, a scale-beam carried by the shaft and revolving with it, a scoop on the beam, means for feeding material into the path of the scoop, and means for delivering a sprinkling-feed into the scoop when in the weighing position.

2. In an automatic weighing-machine, the combination of a horizontal shaft, means for intermittently rotating it, bearings carried by the shaft, a scale-beam supported in the bearings and revolving with the shaft, a scoop on the beam, means for feeding material into the path of the scoop, and means for delivering a sprinkling-feed into the scoop when in the weighing position.

3. In an automatic weighing-machine, the combination of a shaft, means for intermittently rotating it, a scale-beam carried by the shaft and revolving with it, a scoop pivoted to the beam, guides engaging and tipping the scoop, means for feeding material into the path of the scoop, and means for delivering a sprinkling-feed into the scoop when in the weighing position.

4. In an automatic weighing-machine, the combination of a shaft, means for intermittently rotating it, a scale-beam carried by the shaft and revolving with it, a scoop on the beam, a screw for feeding material into the path of the scoop, means for continuously rotating the screw, and means for delivering a sprinkling-feed into the scoop when in the weighing position.

5. In an automatic weighing-machine, the combination of a horizontal shaft, means for intermittently rotating it, a scale-beam carried by the shaft and revolving with it, a scoop on the beam, means for feeding material into the path of the scoop, a pivoted funnel delivering a sprinkling-feed into the scoop when in the weighing position, means for feeding material to the funnel, and means for deflecting the funnel when the right weight is reached.

6. In an automatic weighing-machine, the combination of a shaft, means for intermittently rotating it, a scale-beam carried by the shaft and revolving with it, a scoop on the beam, means for feeding material into the path of the scoop, a pivoted funnel delivering a sprinkling-feed into the scoop when in the weighing position, means for feeding material to the funnel, an armature on the funnel, an electromagnet adapted to attract the armature, a source of current in circuit with the magnet, and means carried by the beam for closing the circuit when the beam balances.

7. In an automatic weighing-machine, the combination of a shaft, means for intermittently rotating it, a scale-beam carried by the shaft and revolving with it, a scoop on the beam, means for feeding material into the path of the scoop, a pivoted funnel delivering a sprinkling-feed into the scoop when in the weighing position, a screw feeding material to the funnel, means for continuously rotating this screw, and means for deflecting the funnel when the right weight is reached.

8. In an automatic weighing-machine, the combination of a horizontal shaft, means for intermittently rotating it, a scale-beam carried by the shaft and revolving with it, a scoop pivoted to the beam, means for feeding material into the path of the scoop, means for delivering a sprinkling-feed into the scoop when in the weighing position, a delivery-chute, and guides engaging the scoop and discharging it over the chute.

9. In an automatic weighing-machine, the combination of a casing having an adjustable opening, a shaft carried by the casing, means for intermittently rotating the shaft, a scale-beam carried by the shaft and revolving with it, a scoop on the beam, means for feeding material to the opening in the casing, and means for delivering a sprinkling-feed into the scoop when in the weighing position.

10. In an automatic weighing-machine, the combination of a constantly-rotating main shaft, a crank-pin carried by the shaft, a rod connected to the pin, a second shaft, a notched disk fast on this shaft and an arm loose upon it and rocked by the rod, a pawl carried by the arm and adapted to turn the disk, means for holding the pawl out of engagement with the disk every alternate forward movement of the pawl, a scale-beam carried by this second shaft and revolving with it, a scoop on the beam, means for feeding material into the path of the scoop, and means for delivering a sprinkling-feed into the scoop when in the weighing position.

EDWARD THOMAS POLLARD.

Witnesses:
EMIL ZEHMANN,
ROBERT B. RANSFORD.